United States Patent
Golovanov et al.

(10) Patent No.: US 11,947,122 B1
(45) Date of Patent: Apr. 2, 2024

(54) TRACKING SYSTEM AND METHOD INCORPORATING SELECTIVE CONTROL OF LIGHT SOURCES OF CONTROLLER

(71) Applicant: Varjo Technologies Oy, Helsinki (FI)

(72) Inventors: Roman Golovanov, Helsinki (FI); Oleksandr Dovzhenko, Espoo (FI); Juha Ala-Luhtala, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/063,541

(22) Filed: Dec. 8, 2022

(51) Int. Cl.
*G02B 27/01* (2006.01)
*G06F 3/01* (2006.01)
*H05B 47/125* (2020.01)

(52) U.S. Cl.
CPC ......... *G02B 27/0172* (2013.01); *G06F 3/012* (2013.01); *H05B 47/125* (2020.01); *G02B 2027/0138* (2013.01); *G02B 2027/014* (2013.01); *G02B 2027/0187* (2013.01)

(58) Field of Classification Search
USPC .......................................................... 345/8
See application file for complete search history.

(56) References Cited

U.S. PATENT DOCUMENTS

| | | | | |
|---|---|---|---|---|
| 2016/0260251 A1* | 9/2016 | Stafford | ............. | G02B 27/0179 |
| 2017/0092235 A1* | 3/2017 | Osman | ..................... | G09G 5/38 |
| 2018/0108179 A1* | 4/2018 | Tomlin | ................... | G06F 3/0346 |
| 2018/0329517 A1* | 11/2018 | Steedly | ...................... | G01D 5/26 |
| 2019/0113325 A1* | 4/2019 | Chung | ........................ | G01S 5/00 |
| 2019/0242952 A1* | 8/2019 | Schneider | ............... | G06F 3/012 |
| 2019/0318501 A1* | 10/2019 | Balan | ..................... | A63F 13/212 |
| 2020/0249748 A1* | 8/2020 | Ranganathan | .......... | A63F 13/40 |
| 2020/0372702 A1* | 11/2020 | Yan | .......................... | G06F 3/011 |
| 2020/0387229 A1* | 12/2020 | Ravasz | .................... | G06F 3/017 |
| 2021/0231962 A1* | 7/2021 | Hudman | ............ | G02B 27/0179 |

* cited by examiner

*Primary Examiner* — Chineyere D Wills-Burns
(74) *Attorney, Agent, or Firm* — Ziegler IP Law Group

(57) ABSTRACT

A tracking system for use in head-mounted device (HMD) includes light sources arranged spatially around user-interaction controller(s); controller-pose-tracking means arranged in user-interaction controller(s); HMD-pose-tracking means; camera(s) arranged on portion of HMD that faces real-world environment in which HMD is in use; and processor(s) configured to estimate relative pose, based on controller-pose-tracking data and HMD-pose-tracking data; determine sub-set of light sources, based on estimated relative pose and arrangement of light sources; selectively control light sources such that light sources of sub-set are activated, whereas remaining light sources are deactivated; process at least one image, captured by camera(s), to identify operational state of light source(s) of sub-set that is visible in image(s), wherein image(s) is indicative of actual relative pose; and correct estimated relative pose to determine actual relative pose, based on operational state.

16 Claims, 5 Drawing Sheets

# TRACKING SYSTEM AND METHOD INCORPORATING SELECTIVE CONTROL OF LIGHT SOURCES OF CONTROLLER

TECHNICAL FIELD

The present disclosure relates to tracking systems for use in head mounted devices (HMD). The present disclosure also relates to methods for tracking.

BACKGROUND

Conventionally, various techniques related to head-mounted devices (HMD) require precise real-time tracking of an input device (for example, such as a controller) that interacts with a user to receive inputs from the user. Some of existing input devices comprise a plurality of light-emitting elements (for example, such as light-emitting diodes (LEDs)) or other light sources that are arranged on the controller device in a way that the controller device is visible to the HMD from all angles and orientations. The illumination of such light-emitting elements enables the tracking of the input device by the HMD.

However, the present solutions for tracking the controller device require the plurality of the to be illuminated at all times during use to enable the tracking of the controller device by the HMD. Thus, the illumination of the light-emitting elements at all times results in wastage of power and processing resources, making the process of tracking the controller device cumbersome and inconvenient for the user as a battery life of the controller device significantly decreases.

Therefore, in light of the foregoing discussion, there exists a need to overcome the aforementioned drawbacks associated with existing tracking solutions for use in the HMD.

SUMMARY

The present disclosure seeks to provide a tracking system for use in a head-mounted device (HMD). The present disclosure also seeks to provide a method for tracking. An aim of the present disclosure is to provide a solution that overcomes at least partially the problems encountered in prior art.

In one aspect, an embodiment of the present disclosure provides a tracking system for use in a head-mounted device (HMD), the tracking system comprising:
 a plurality of light sources arranged spatially around at least one user-interaction controller of the HMD;
 a controller-pose-tracking means arranged in the at least one user-interaction controller;
 an HMD-pose-tracking means;
 at least one camera arranged on a portion of the HMD that faces a real-world environment in which the HMD is in use; and
 at least one processor configured to:
  estimate a relative pose of the at least one user-interaction controller with respect to the HMD, based on controller-pose-tracking data generated by the controller-pose-tracking means and HMD-pose-tracking data generated by the HMD-pose-tracking means;
  determine a sub-set of light sources from amongst the plurality of light sources that would be visible from a perspective of the at least one camera, based on the estimated relative pose of the at least one user-interaction controller with respect to the HMD and the arrangement of the plurality of light sources arranged spatially around the at least one user-interaction controller of the HMD;
  selectively control the plurality of light sources such that the light sources of the sub-set are activated, whereas remaining light sources from amongst the plurality of light sources are deactivated;
  process at least one image of the real-world environment, captured by the at least one camera, to identify an operational state of at least one light source of the sub-set that is visible in the at least one image, wherein the at least one image is indicative of an actual relative pose of the at least one user-interaction controller with respect to the HMD; and
  correct the estimated relative pose of the at least one user-interaction controller with respect to the HMD to determine the actual relative pose of the at least one user-interaction controller with respect to the HMD, based on the operational state of the at least one light source.

In another aspect, an embodiment of the present disclosure provides a method for tracking, the method comprising:
 estimating a relative pose of at least one user-interaction controller with respect to a head-mounted device (HMD), based on controller-pose-tracking data generated by a controller-pose-tracking means arranged in the at least one user-interaction controller and HMD-pose-tracking data generated by an HMD-pose-tracking means;
 determining a sub-set of light sources from amongst a plurality of light sources that would be visible from a perspective of at least one camera, based on the estimated relative pose of the at least one user-interaction controller with respect to the HMD and an arrangement of the plurality of light sources arranged spatially around the at least one user-interaction controller of the HMD, the at least one camera being arranged on a portion of the HMD that faces a real-world environment in which the HMD is in use;
 selectively controlling the plurality of light sources such that only the light sources of the sub-set are activated, whereas remaining light sources from amongst the plurality of light sources are deactivated;
 processing at least one image of the real-world environment, captured by the at least one camera, for identifying an operational state of at least one light source of the sub-set that is visible in the at least one image, wherein the at least one image is indicative of an actual relative pose of the at least one user-interaction controller with respect to the HMD; and
 correcting the estimated relative pose of the at least one user-interaction controller with respect to the HMD to determine the actual relative pose of the at least one user-interaction controller with respect to the HMD, based on the operational state of the at least one light source.

Embodiments of the present disclosure substantially eliminate or at least partially address the aforementioned problems in the prior art, and enable accurate tracking of the at least one user-interaction controller in an efficient manner that optimizes power consumption and significantly increases a battery life of the at least one user-interaction controller.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
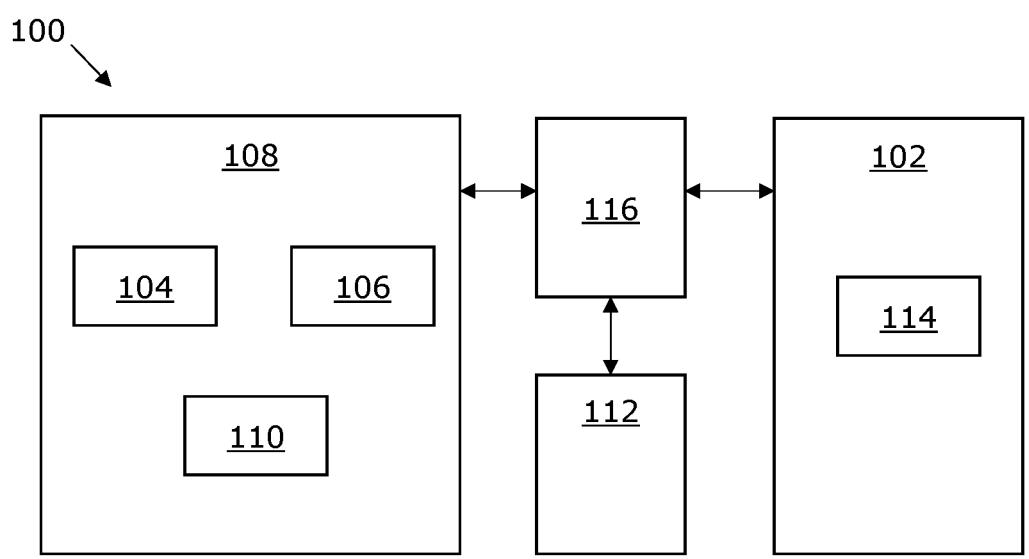
FIG. 1 illustrates a block diagram of architecture of a tracking system for use in a head-mounted device (HMD), in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a tracking system for use in a head-mounted device (HMD), the tracking system comprising:
  a plurality of light sources arranged spatially around at least one user-interaction controller of the HMD;
  a controller-pose-tracking means arranged in the at least one user-interaction controller;
  an HMD-pose-tracking means;
  at least one camera arranged on a portion of the HMD that faces a real-world environment in which the HMD is in use; and
  at least one processor configured to:
    estimate a relative pose of the at least one user-interaction controller with respect to the HMD, based on controller-pose-tracking data generated by the controller-pose-tracking means and HMD-pose-tracking data generated by the HMD-pose-tracking means;
    determine a sub-set of light sources from amongst the plurality of light sources that would be visible from a perspective of the at least one camera, based on the estimated relative pose of the at least one user-interaction controller with respect to the HMD and the arrangement of the plurality of light sources arranged spatially around the at least one user-interaction controller of the HMD;
    selectively control the plurality of light sources such that the light sources of the sub-set are activated, whereas remaining light sources from amongst the plurality of light sources are deactivated;
    process at least one image of the real-world environment, captured by the at least one camera, to identify an operational state of at least one light source of the sub-set that is visible in the at least one image, wherein the at least one image is indicative of an actual relative pose of the at least one user-interaction controller with respect to the HMD; and
    correct the estimated relative pose of the at least one user-interaction controller with respect to the HMD to determine the actual relative pose of the at least one user-interaction controller with respect to the HMD, based on the operational state of the at least one light source.

In another aspect, an embodiment of the present disclosure provides a method for tracking, the method comprising:
  estimating a relative pose of at least one user-interaction controller with respect to a head-mounted device (HMD), based on controller-pose-tracking data generated by a controller-pose-tracking means arranged in the at least one user-interaction controller and HMD-pose-tracking data generated by an HMD-pose-tracking means;
  determining a sub-set of light sources from amongst a plurality of light sources that would be visible from a perspective of at least one camera, based on the estimated relative pose of the at least one user-interaction controller with respect to the HMD and an arrangement of the plurality of light sources arranged spatially around the at least one user-interaction controller of the HMD, the at least one camera being arranged on a portion of the HMD that faces a real-world environment in which the HMD is in use;
  selectively controlling the plurality of light sources such that only the light sources of the sub-set are activated, whereas remaining light sources from amongst the plurality of light sources are deactivated;
  processing at least one image of the real-world environment, captured by the at least one camera, for identifying an operational state of at least one light source of the sub-set that is visible in the at least one image, wherein the at least one image is indicative of an actual relative pose of the at least one user-interaction controller with respect to the HMD; and
  correcting the estimated relative pose of the at least one user-interaction controller with respect to the HMD to determine the actual relative pose of the at least one user-interaction controller with respect to the HMD, based on the operational state of the at least one light source.

The present disclosure provides the aforementioned tracking system and the aforementioned method for tracking. Herein, each of the light source from the plurality of the light sources need not to be activated at all times. Since, only the light sources of the sub-set are to be activated at a given moment of time to enable the tracking of the at least one user-interaction controller, thus, advantageously optimizing power consumption and significantly improving a battery life of the at least one user-interaction controller. Moreover, the tracking system efficiently reduces the processing requirements by simplifying the process of determining the sub-set of light sources that are to be activated. Furthermore, the tracking system is able to effectively track more than one user-interaction controllers simultaneously. In deed controller-pose-tracking info and head-mounted device (HMD) pose info is used to estimate what is the relative pose of user interaction controller of the HMD. This information is used select which light sources (in practice LED's) of the controller are activated and which are not. In practice those light sources which are facing camera of the HMD are activated and others are not. This way we can save approximately (depending on form factor and pose of the controller in relation to the HMD) 50% of power related to operating the light sources.

Throughout the present disclosure, the term "HMD" refers to specialized equipment that is configured to present an extended-reality (XR) environment to the user when the HMD in operation is worn by the user on his/her head. In such an instance, the HMD acts as a device (for example, such as an XR headset, a pair of XR glasses, and the like) that is operable to present a visual scene of the XR environment to the user. Throughout the present disclosure, the term "extended-reality" encompasses virtual reality (VR), augmented reality (AR), mixed reality (MR), and the like.

Notably, the HMD requires the tracking system in order to accurately track the actual relative pose of the at least one user-interaction controller with respect to the HMD, since the at least one user-interaction controller is used by a user to provide input signals to the HMD. Herein, the input signals are related to various applications for which the HMD is used. The input signals optionally comprise a signal indicative of a position of the at least one user-interaction controller and an orientation of the at least one user-interaction controller. For example, the tracking system is used by the HMD to detect the input signals given by the user related to a gaming application, and the like.

It will be appreciated that the tracking system for use in the HMD is implemented in a manner that some of its components are arranged in the HMD (for example, inside the HMD, on the HMD, and similar) and its other components are arranged outside the HMD. In other words, the tracking system is implemented both internal to, and external to the HMD.

Throughout the present disclosure, the term "user-interaction controller" refers to specialized equipment that is employed by the user to interact with the XR environment. Notably, the user interacts with the XR environment by providing input(s) to the HMD, via the at least one user-interaction controller. The at least one user-interaction controller is communicably coupled to the HMD. Said coupling is wired, wireless, or a combination thereof. The at least one user-interaction controller is ergonomically designed to be portable, compact, and lightweight, so that the user is able to use it conveniently.

Optionally, the at least one user-interaction controller is implemented as at least one of: a keyboard, a mouse, a touchpad, a push button controller, a joystick, a gamepad, an interactive board, a tablet computer, a laptop computer, a trackball. Optionally, the at least one user-interaction controller has a curved loop portion and a stick portion coupled to the curved loop portion.

Throughout the present disclosure, the term "light source" refers to an element from which light emanates. In other words, a light source, when activated, emits light. Optionally, the plurality of light sources is arranged spatially around the at least one user-interaction controller, on the curved loop portion of the at least one user-interaction controller. Optionally, the plurality of light sources comprises at least two of: an infrared light-emitting diode, a visible-light emitting diode.

Throughout the present disclosure, the term "controller-pose-tracking means" refers to specialized equipment that is employed to detect and/or follow the pose of the at least one user-interaction controller within the real-world environment. Pursuant to embodiments of the present disclosure, the controller-pose-tracking means is implemented as a true six Degrees of Freedom (6DoF) tracking system.

It will be appreciated that the controller-pose-tracking means could optionally be implemented as an internal component of the at least one user-interaction controller, as a tracking system external to the user-interaction controller user-interaction controller, or as a combination thereof. As an example, the controller-pose-tracking means may be implemented as at least one of: an accelerometer, a gyroscope, an Inertial Measurement Unit (IMU), a Timing and Inertial Measurement Unit (TIMU). As another example, the controller-pose-tracking means may be implemented as a receiver that is employed to sense signals emitted from an emitter. When the emitter is arranged in the real-world environment, the receiver is arranged on the user-interaction controller user-interaction controller, and vice-versa. Optionally, in this regard, the receiver is implemented as a sensor that, in operation, senses the emitted signals, the emitted signals being at least one of: magnetic signals, electromagnetic signals (for example, such as radio signals, visible signals (light), infrared signals, and the like), acoustic signals. Likewise, optionally, the emitter is implemented as at least one of: a magnetic signal emitter, an electromagnetic signal emitter, an acoustic signal emitter. It will be appreciated that the receiver is compatible with the emitter.

Throughout the present disclosure, the term "HMD-pose-tracking means" refers to specialized equipment that is employed to detect and/or follow a pose of the HMD within the real-world environment. Throughout the present disclosure, the term "pose" encompasses both position and orientation. Pursuant to embodiments of the present disclosure, the HMD-pose-tracking means is implemented as a true six Degrees of Freedom (6DoF) tracking system. In other words, the HMD-pose-tracking means tracks both the position and the orientation of the HMD within a three-dimensional (3D) space of the real-world environment, which can be optionally represented by a global coordinate system. In particular, the HMD-pose-tracking means is configured to track translational movements (namely, surge, heave and sway movements) and rotational movements (namely, roll, pitch and yaw movements) of the HMD within the 3D space.

The HMD-pose-tracking means could be implemented as an internal component of the HMD, as a tracking system external to the HMD, or as a combination thereof. As an internal component of the HMD, the HMD-pose-tracking means could be implemented as at least one of: an accelerometer, a gyroscope, an Inertial Measurement Unit (IMU), a Timing and Inertial Measurement Unit (TIMU). As an external tracking system, the HMD-pose-tracking means could be implemented as at least one detector that is employed to detect at least one detectable object. When the at least one detectable object is arranged in the real-world environment, the at least one detector is arranged on the HMD, and vice versa. Optionally, in this regard, the at least one detectable object is implemented as at least one marker (for example, such as an active infrared (IR) LED, a visible LED, a laser illuminator, a Quick Response (QR) code, an ArUco marker, a Radio Frequency Identification (RFID) marker and the like), whereas the at least one detector is implemented as at least one of: an IR camera, an IR transceiver, a visible light camera, an RFID reader.

Throughout the present disclosure, the term "processor" refers to hardware, software, firmware or a combination of these, suitable for controlling the operation of the tracking system. The at least one processor is communicably coupled with the HMD, the HMD-pose-tracking means, and the at least one user-interaction controller wirelessly and/or in a wired manner. In particular, the at least one processor is communicably coupled to other components of the tracking system. It will be appreciated that the term "at least one processor" refers to "one processor" in some implementations, and "a plurality of processors" in other implementations. In some implementations, the at least one processor is implemented as a processor of the HMD. In other implementations, the at least one processor is implemented as the processor of the HMD and a processor of an external computing device, wherein the external computing device is communicably coupled with the HMD wirelessly or in a wired manner. In such a case, at least a part of all the aforementioned processing tasks of the at least one processor is performed at the processor of the external computing device. This considerably reduces processing burden on the processor of the HMD.

Throughout the present disclosure, the term "relative pose" refers to a relative position and/or a relative orientation of the at least one user-interaction controller with respect to the HMD. The relative pose is indicative of which specific portion of the at least one user-interaction controller at which certain orientation is visible from the perspective of the HMD at a given point of time. Notably, use of both the controller-pose-tracking data and the HMD-pose-tracking data allows the at least one processor to know the positions and/or orientations of the HMD and the at least one user-interaction controller, and thus, enables the at least one processor to estimate the relative pose of the at least one user-interaction controller with respect to the HMD.

Optionally, when estimating the relative pose of the at least one user-interaction controller with respect to the HMD, the at least one processor is configured to:
  process the controller-pose-tracking data to determine a pose of the at least one user-interaction controller in its local coordinate system;
  process the HMD-pose-tracking data to determine a pose of the HMD in a global coordinate system;
  convert the pose of the at least one user-interaction controller from said local coordinate system to the global coordinate system; and
  determine the relative pose of the at least one user-interaction controller with respect to the HMD, based on the pose of the at least one user-interaction controller in the global coordinate system and the pose of the HMD in the global coordinate system.

Herein, the term "local coordinate system" of the at least one user-interaction controller refers to a coordinate system that serves as a local frame of reference that is specific for the at least one user-interaction controller. Herein, the term "global coordinate system" refers to a coordinate system that represents the three-dimensional (3D) space of the real-world environment as a global frame of reference. Optionally, the pose of the at least one user-interaction controller is converted from the aforesaid local coordinate system to the global coordinate system, for the pose of the at least one user-interaction controller in the global coordinate system to be compatible to use (i.e., for analysis) with respect to the pose of the HMD in the global coordinate system, to determine the relative pose of the at least one user-interaction controller with respect to the HMD. In this regard, determining the pose of the at least one user-interaction controller in its local coordinate system (i.e., local tracking of the at least one user-interaction controller), beneficially allows for a substantially more accurate estimation of the relative pose of the at least one user-interaction controller with respect to the HMD. Optionally, a conversion function between the local coordinate system of the controller-pose-tracking means and the global coordinate system is pre-known.

Optionally, when processing the HMD-pose-tracking data to determine the pose of the HMD in the global coordinate system, the at least one processor is configured to:
  process the HMD-pose-tracking data to determine a pose of the HMD in its local coordinate system; and
  convert the pose of the HMD from said local coordinate system to the global coordinate system.

In this regard, determining the pose of the HMD in its local coordinate system (i.e., local tracking of the HMD), beneficially allows a more accurate tracking of the HMD in the global coordinate system, where a conversion function between the local coordinate system of the HMD-pose-tracking means and the global coordinate system is pre-known.

Throughout the present disclosure, the term "camera" refers to a device that comprises one or more image sensors for capturing images. In use, the at least one camera captures images representing the at least one user-interaction controller in the real-world environment in which the HMD is in use. Thus, the at least one camera is arranged on the HMD such that an image capturing portion of the at least one camera is always facing the real-world environment. In an implementation, the tracking system may comprise two cameras arranged at a distance from each other on an outer surface of the HMD that faces the real-world environment, said distance being equal or nearly equal to an interpupillary distance of humans. In another implementation, the tracking system may comprise four cameras, where each of the four cameras is arranged at a respective corner of an outer surface of the HMD that faces the real-world environment.

Optionally, the at least one camera is implemented as at least one visible light camera. Examples of a given visible light camera include, but are not limited to, a Red-Green-Blue-Depth (RGB), a monochrome camera. It will be appreciated that the at least one camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the at least one camera may be implemented as the stereo camera. Optionally, the at least one camera is implemented as at least one infrared light camera. It will be appreciated that a type of the at least one camera depends on a type of light emitted by the plurality of light sources upon activation. For example, when the plurality of light sources emits visible light, the at least one camera may be implemented as the at least one visible light camera, and when the plurality of light sources emit infrared light, the at least one camera may be implemented as the at least one infrared light camera.

Notably, when the at least one camera faces the real-world environment, a whole surface area of the at least one user-interaction controller that has the plurality of light sources arranged thereon is not completely visible from the perspective of the at least one camera at any given moment of time. Therefore, based on the estimated relative pose of the at least one user-interaction controller with respect to the HMD, the at least one processor first determines which portion of the at least one user-interaction controller is visible from the perspective of the at least one camera. Thus, accordingly, the at least one processor determines the sub-set of light sources from amongst the plurality of light sources that would be visible from the perspective of the at least one camera, based on the arrangement of the plurality of the light sources arranged spatially around the at least one user-interaction controller of the HMD which is pre-known to the at least one processor. The sub-set of light sources comprises one or more light sources that are arranged on that portion of the at least one user-interaction controller which is visible from the perspective of the at least one camera. It will be appreciated that once the sub-set of the light sources is determined, only the light sources of the sub-set are activated (i.e., controlled to emanate light), thus allowing the tracking system to optimize the power consumption as the remaining light sources from amongst the plurality of sources are deactivated (i.e., the given light source is not emanating light). This selective controlling of the plurality of light sources offers considerable power savings and enables in prolonging battery life of the at least one user-interaction controller.

It will be appreciated that "activating" a given light source refers to controlling the given light source (for example, by switching it on) such that the given light source emits light. In this regard, the given light source may be supplied with a low current (i.e., it may be dimly-lit), with a requisite current (i.e., it may be lit at a typical brightness of an 'ON' state of the given light source), with a high current (i.e., it may be very brightly-lit), or similar. Likewise, "deactivating" a given light source refers to controlling the given light source (for example, by switching it off) such that the given light source does not emits light. In this regard, the given light source may be supplied with a zero current (i.e., it may be not lit).

Optionally, wherein when selectively controlling the plurality of light sources, the at least one processor is configured to:
generate and send a first drive signal to the light sources of the sub-set, wherein upon receiving the first drive signal, the light sources of the sub-set are activated; and
generate and send a second drive signal to the remaining light sources from amongst the plurality of light sources, wherein upon receiving the second drive signal, the remaining light sources are deactivated.

Herein, the term "first drive signal" refers to a signal that provides a forward bias voltage to the light sources of the sub-set. Optionally, the magnitude of the first drive signal may be different for different light sources from within the light sources of the sub-set, and thus, different light sources from with light sources of the sub-set may activate with different brightness. Herein, the term "second drive signal" refers to the signal that provides a reverse bias voltage to the remaining light sources from amongst the plurality of light sources. Herein, the first drive signal is different from the second drive signal as the first drive signal activates the light sources of the sub-set whereas the second drive signal deactivates the remaining light sources. Optionally, the first drive signal and the second drive signal are sent via a driver element (for example, an LED driver). Advantageously, the activation or the deactivation of each light source from amongst the plurality of light sources is efficiently controlled separately using separate drive signals, optionally, in a synchronized manner.

Notably, processing of the at least one image relates to detection of the at least one user-interaction controller in the at least one image by running an object detection algorithm over the at least one image, where the object detection module differentiates the at least one user-interaction controller from other objects of the real-world environment that are detected from the at least one image. Subsequently, once the at least one user-interaction controller is detected, the at least one processor determines what portion of the at least one user-interaction controller at which orientation and position is visible in the at least one image, which indicates the actual relative pose of the at least one user-interaction controller with respect to the HMD.

Throughout the present disclosure, the term "actual relative pose" refers to an actual position and/or an actual orientation of the at least one user-interaction controller with respect to the HMD in the real-world environment. Moreover, the at least one processor identifies the at least one light source of the sub-set that is visible in the at least one image and then subsequently, identifies the operational state (i.e., whether a certain light source is activated or deactivated) of the at least one light source of the sub-set. In this regard, to identify the operational state of the at least one light source of the sub-set, the at least one processor analyzes pixel values of pixels that represent the at least one light source of the sub-set. Herein, the pixel values of an activated light source differs from the pixel values of a deactivated light source, that enable the at least one processor to identify the operational state of the at least one light source of the sub-set. The term "pixel value" of a given pixel refers to an illumination value of the given pixel which encompasses not only a colour value (namely, intensity) of the given pixel, but also a luminance value (for example, such as a hue value, a saturation value, and a lightness value), a transparency value, or similar, of the given pixel. For example, the pixel values for the at least one light source of the sub-set that is activated may have RGB values of (255, 255, 255) with a deviation of 15 percent, whereas the pixel values for the at least one light source of the sub-set that is deactivated may have RGB values of (0, 0, 0) with a deviation of 15 percent. Since the at least one processor accurately identifies the at least one light source of the sub-set that is visible in the at least one image and the operational state of the at least one light source, the at least one processor is able to accurately determine which portion of the at least one user-interaction controller is actually visible from the perspective of the at least one camera and what is the offset (if any) between the estimated relative pose and the actual relative pose. In other words, identifying the operational state of the at least one light source of the sub-set allows the at least one processor to determine which specific light sources from the plurality of the light sources are actually visible from the perspective of the at least one camera, and whether the specific light sources are activated or not.

Notably, the operational state of the at least one light source that is identified by the at least one processor is used to determine the actual relative pose. In this regard, the at least one processor checks if the sub-set of the light sources and the operational state of each light source of the sub-set of light sources (that is determined according to the estimated relative pose) accurately matches with the identified operational state of the at least one light source of the sub-set that is visible in the image. In case of a mis-match, it is determined that the estimated relative pose is not accurate, as it is different from the actual relative pose, and vice versa. Subsequently, if any disparity is found between the actual relative pose and the estimated relative pose, then the estimated relative pose is corrected by the at least one processor to determine the actual relative pose of the at least one user-interaction controller with respect to the HMD. In essence, the light sources of the sub-set and the operational state of each of the light sources of the sub-set is accordingly changed to be identical to the operation state of the at least one light source of the sub-set.

For example, there may be seven light sources L1, L2, L3, L4, L5, L6, L7 that are spatially arranged around the at least one user-interaction controller of the HMD. The sub-set of the light sources that is determined to be visible from the perspective of the at least one camera based on the estimated relative pose may comprise the light sources L1, L2, L3 and L4 out of the seven light sources L1-L7. Therefore, the light sources L1-L7 are selectively controlled such that the light sources L1, L2, L3 and L4 are activated and the remaining light sources L5-L7 from amongst the seven light sources are deactivated. However, when the at least one image is processed, it is identified that the light sources L2, L3, L4 and L5 are visible in the at least one image. In particular, three light sources L2-L4 from amongst the sub-set are visible in the at least one image whereas one light source L1 from amongst the sub-set is not visible in the at least one image. Moreover, it is identified that operational states of the light sources L2, L3 and L4 is 'activated', and an operational state for the light source L5 is 'deactivated'. This clearly shows that the estimated relative pose was slightly incorrect and based on arrangement of visible light sources L2-L5 and their operational states as represented in the at least one image, an appropriate correction can be determined and applied to the estimated relative pose to determine the actual relative pose. Furthermore, optionally, based on the actual relative pose, the light source L1 is deactivated and the light source L5 is activated.

Optionally, when the at least one image represents one or more light sources whose operational state is deactivated, the at least one processor is configured to control the one or more light sources such that the one or more light sources are activated. A technical benefit of doing so is that this allows the at least one controller to be tracked accurately as all light sources that are visible from the perspective of the at least one camera are activated.

Optionally, when it is identified that the operational state of the at least one light source that is visible in the at least one image is that the at least one light source is deactivated, the at least one processor is further configured to:
 control the plurality of light sources such that each of the plurality of light sources is activated;
 process at least one next image of the real-world environment, captured by the at least one camera, to identify the operational state of one or more light sources that are visible in the at least one next image, wherein the at least one next image is indicative of the actual relative pose of the at least one user-interaction controller with respect to the HMD; and
 correct the estimated relative pose of the at least one user-interaction controller with respect to the HMD to determine the actual relative pose of the at least one user-interaction controller with respect to the HMD, based on the operational state of the one or more light sources.

In this regard, the at least one image indicates that the tracking of the plurality of the light sources is temporarily lost due to any exceptional situation, since light source(s) that is/are visible in the image is/are in a deactivated state. Even in such a situation, the tracking system is able to reset itself by controlling each of the plurality of light sources to be activated and then by determining the actual relative pose using operational states of the one or more light sources that are visible in the at least one next image. Herein, the at least one next image succeeds the at least one image, and is captured after each of the plurality of light sources is controlled to be activated. Since the at least one next image is indicative of the actual relative pose of the at least one user-interaction controller with respect to the HMD, it is accordingly used to correct the estimated relative pose of the at least one user-interaction controller with respect to the HMD. Hence, beneficially, the tracking system does not come to an operational halt even in exceptional situations when the tracking of the plurality of the light sources is temporarily lost by the HMD.

Optionally, the at least one processor is further configured to generate a visualization representing at least one of: the at least one user-interaction controller in its local coordinate system, the at least one user-interaction controller in a global coordinate system, required operational states of the plurality of light sources for selectively controlling the plurality of light sources. Herein, the term "visualization" refers to a graphical representation that is capable of being displayed (for example, on a display element of the HMD, or an external display screen connected to the HMD, or similar). In this regard, the visualization that is generated is in form of at least one of an image, a three-dimensional graph, a list, and the like. The visualization may be displayed during and/or after a usage session of the HMS and the tracking system. The visualization is advantageously used, for example, by the user, by the at least one processor, and the like, for analyzing and tracking results of the tracking system, wherein based on the visualization, the tracking system may provide a feedback to the user to amend his/her way of interacting with the at least one user-interaction controller, generate a movement trajectory of the at least one user-interaction controller, and similar.

Optionally, the plurality of light sources and the at least one camera are operatively synchronized in a manner that the at least one image is captured when the plurality of light sources are selectively controlled to activate only the light sources of the sub-set. Herein, the synchronization of the at least one camera with the plurality of light sources ensures that a time difference between selectively controlling the plurality of the light sources and capturing the at least one image is minimal. Therefore, the estimated relative pose is unlikely to change drastically in said time difference. Thus, advantageously, the required correction in the estimated relative pose of the at least one user-interaction controller with respect to the HMD is minimal.

Optionally, the at least one user-interaction controller comprises a first user-interaction controller and a second user-interaction controller for a first body part and a second body part of a user, respectively, wherein a first sub-set of light sources of the first user-interaction controller and a second sub-set of light sources of the second user-interaction controller are determined to be visible from the perspective of the at least one camera, and wherein the selective controlling of the plurality of light sources is performed using different control signals for the first user-interaction controller and the second user-interaction controller. Herein, the "control signal" for a given user-interaction controller comprises the first drive signal and the second drive signal for selectively activating and deactivating the plurality of light sources of the given user-interaction controller. In this regard, different control signals are employed for different user-interaction controllers since the different body parts associated with the different user-interaction controllers may move differently. Moreover, the different control signals enable to efficiently distinguish between the first user-interaction controller and the user-interaction controller, where the arrangement of a first plurality of light sources on the first user-interaction controller is different from the arrangement of a second plurality of light sources on the second user-interaction controller. For example, the first user-interaction controller may be used for a left hand or a left wrist of the user, whereas the second user-interaction controller may be used for a right hand or a right wrist of the user. The tracking system is beneficially capable of tracking more than one user-interaction controllers by using a different sub-set of light sources and the respective different control signals for each respective at least one user-interaction controller.

The present disclosure also relates to the device as described above. Various embodiments and variants disclosed above, with respect to the aforementioned first aspect, apply mutatis mutandis to the device.

Optionally, when it is identified that the operational state of the at least one light source that is visible in the at least one image is that the at least one light source is deactivated, the method further comprises:
controlling the plurality of light sources such that each of the plurality of light sources is activated;
processing at least one next image of the real-world environment, captured by the at least one camera, to identify an operational state of one or more light sources that are visible in the at least one next image, wherein the at least one next image is indicative of the actual relative pose of the at least one user-interaction controller with respect to the HMD; and
correcting the estimated relative pose of the at least one user-interaction controller with respect to the HMD for determining the actual relative pose of the at least one user-interaction controller with respect to the HMD, based on the operational state of the one or more light sources.

Optionally, the method further comprises generating a visualization representing at least one of: the at least one user-interaction controller in its local coordinate system, the at least one user-interaction controller in a global coordinate system, required operational states of the plurality of light sources for selectively controlling the plurality of light sources.

Optionally, the step of estimating the relative pose of the at least one user-interaction controller with respect to the HMD comprises:
processing the controller-pose-tracking data to determine a pose of the at least one user-interaction controller in its local coordinate system;
processing the HMD-pose-tracking data to determine a pose of the HMD in a global coordinate system;
converting the pose of the at least one user-interaction controller from said local coordinate system to the global coordinate system; and
determining the relative pose of the at least one user-interaction controller with respect to the HMD, based on the pose of the at least one user-interaction controller in the global coordinate system and the pose of the HMD in the global coordinate system.

Optionally, the step of processing the HMD-pose-tracking data to determine the pose of the HMD in the global coordinate system comprises:
processing the HMD-pose-tracking data to determine a pose of the HMD in its local coordinate system; and
converting the pose of the HMD from said local coordinate system to the global coordinate system.

Optionally, the step of selectively controlling the plurality of light sources comprises:
generating and sending a first drive signal to the light sources of the sub-set, wherein upon receiving the first drive signal, the light sources of the sub-set are activated; and
generating and sending a second drive signal to the remaining light sources from amongst the plurality of light sources, wherein upon receiving the second drive signal, the remaining light sources are deactivated.

Optionally, the plurality of light sources and the at least one camera are operatively synchronized in a manner that the at least one image is captured when the plurality of light sources are selectively controlled to activate only the light sources of the sub-set.

Optionally, the at least one user-interaction controller comprises a first user-interaction controller and a second user-interaction controller for a first body part and a second body part of a user, respectively, wherein a first sub-set of light sources of the first user-interaction controller and a second sub-set of light sources of the second user-interaction controller are determined to be visible from the perspective of the at least one camera, and wherein the selective controlling of the plurality of light sources is performed using different control signals for the first user-interaction controller and the second user-interaction controller.

DETAILED DESCRIPTION OF THE DRAWINGS

Referring to FIG. 1, illustrated is a block diagram of an architecture of a tracking system 100 for use in a head-mounted device (HMD) 102, in accordance with an embodiment of the present disclosure. The tracking system 100 comprises a plurality of light sources (depicted as light sources 104 and 106) arranged spatially around at least one user-interaction controller (depicted as a user-interaction controller 108) of the HMD 102, a controller-pose-tracking means 110 arranged in the user-interaction controller 108, an HMD-pose-tracking means 112, at least one camera (depicted as a camera 114) arranged on a portion of the HMD 102 that faces a real-world environment in which the HMD 102 is in use, and at least one processor (depicted as a processor 116). The processor 116 is communicably coupled to the HMD 102, the user-interaction controller 108, the HMD-pose-tracking means 112.

It may be understood by a person skilled in the art that the FIG. 1 includes an architecture of the tracking system 100 for sake of clarity, which should not unduly limit the scope of the claims herein. The person skilled in the art will recognize many variations, alternatives, and modifications of embodiments of the present disclosure. For example, one or more elements of the tracking system 100 (such as the HMD-pose-tracking means 112 and/or the processor 116) may be arranged in the HMD 102.

Figure 2A:
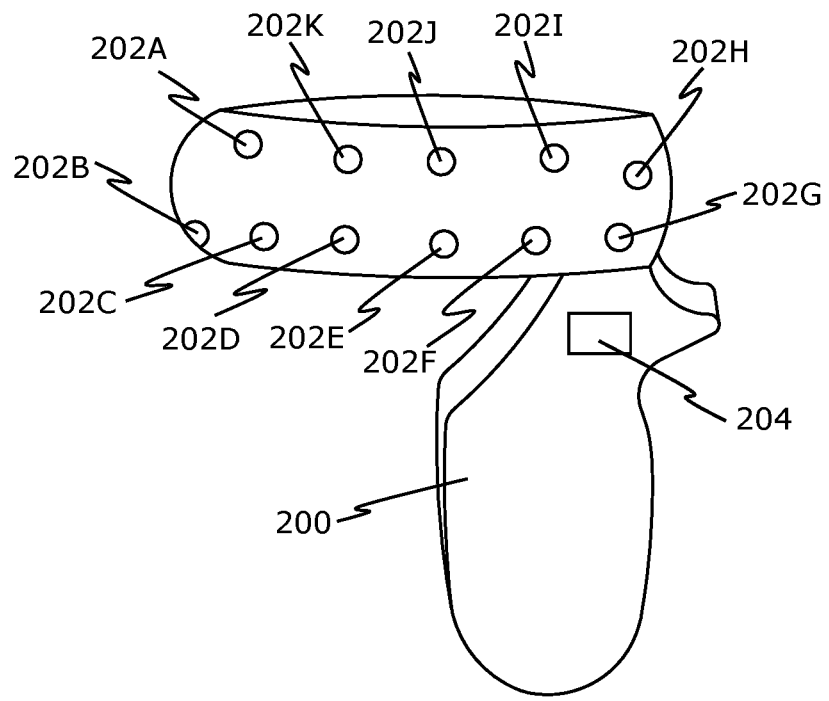
FIGS. 2A and 2B illustrate a side perspective view and a front perspective view, respectively, of a user-interaction controller, in accordance with an embodiment of the present disclosure.
Figure 2B:
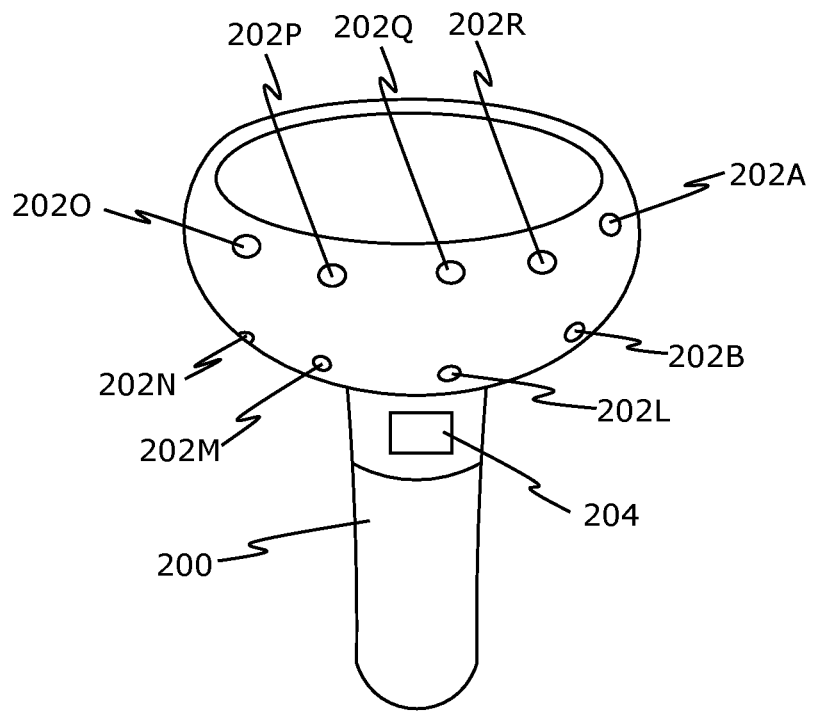

Referring to FIGS. 2A and 2B, illustrated are a side perspective view and a front perspective view, respectively, of a user-interaction controller 200, in accordance with an embodiment of the present disclosure. The user-interaction controller 200 comprises a plurality of light sources (depicted as light sources 202A, 202B, 202C, 202D, 202E, 202F, 202G, 202H, 202I, 202J, and 202K that are visible in FIG. 2A, and depicted as light sources 202A, 202B, 202L, 202M, 202N, 202O, 202P, 202Q, and 202R that are visible in FIG. 2B) spatially arranged around the user-interaction controller 200. As shown, for example, the light sources 202A-202R are arranged along a curved loop portion of the user-interaction controller 200. The controller 200 also comprises a controller-pose-tracking means 204.

It may be understood by a person skilled in the art that the FIGS. 2A and 2B include a front view and a side view of the user-interaction controller 200 for sake of clarity, which should not unduly limit the scope of the claims herein. It is to be understood that the specific implementations of the user-interaction controller 200 are provided as examples and are not to be construed as limiting it to specific numbers or types of cameras and to specific numbers or types of light sources. The person skilled in the art will recognize many variations, alternatives, and modifications of embodiments of the present disclosure.

Figure 3A:
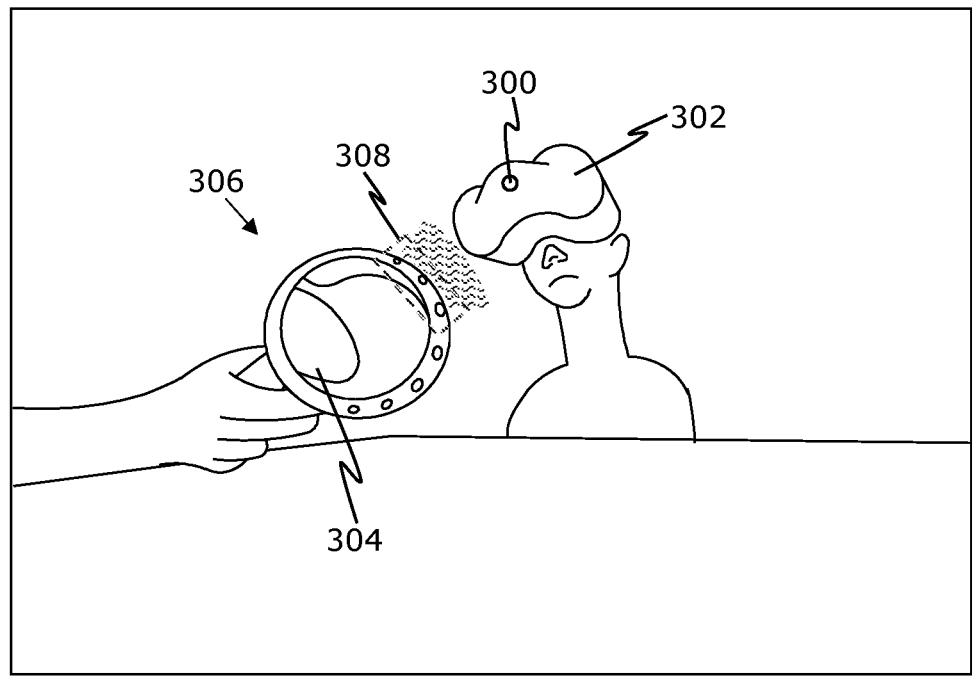
FIGS. 3A and 3B illustrate different sub-sets of light sources that would be visible from a perspective of a camera arranged on a HMD for different estimated relative poses of a user-interaction controller with respect to the HMD, in accordance with an embodiment of the present disclosure.
Figure 3B:
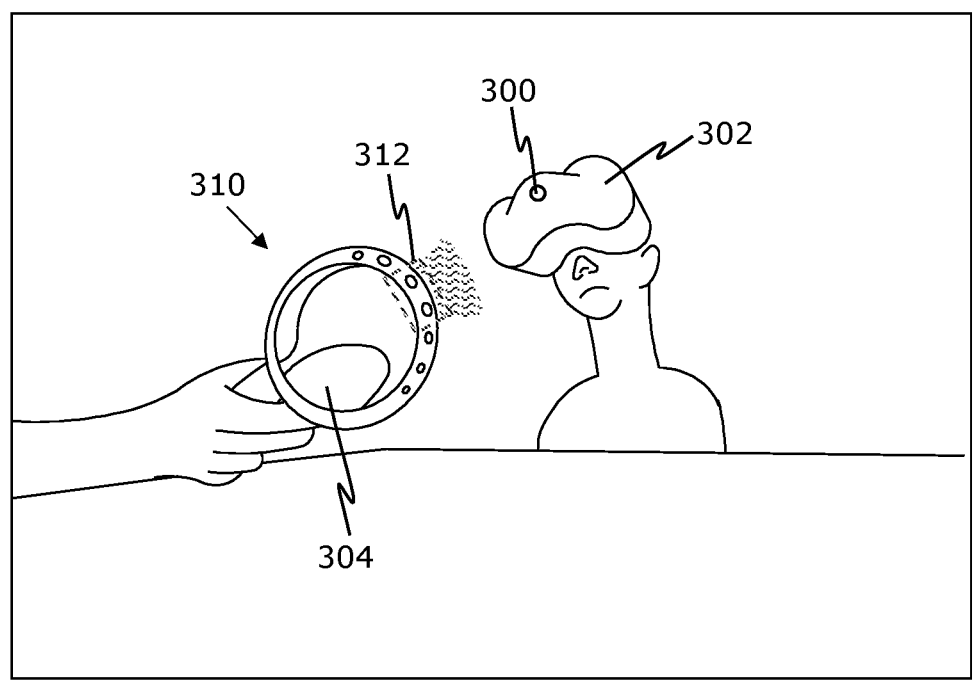

Referring to FIGS. 3A and 3B, illustrated are different sub-sets of light sources that would be visible from a perspective of a camera 300 arranged on an HMD 302 for different estimated relative poses of a user-interaction controller 304 with respect to the HMD 302, in accordance with an embodiment of the present disclosure. As shown in FIG. 3A, based on the first estimated relative pose 306 of the user-interaction controller 304 with respect to the HMD 302, a first sub-set of light sources 308 is visible from the perspective of the camera 300. As shown in FIG. 3B, based on second estimated relative pose 310 of the user-interaction controller 304 with respect to the HMD 302, a second sub-set of light sources 312 is visible from the perspective of the camera 300.

Figure 4:
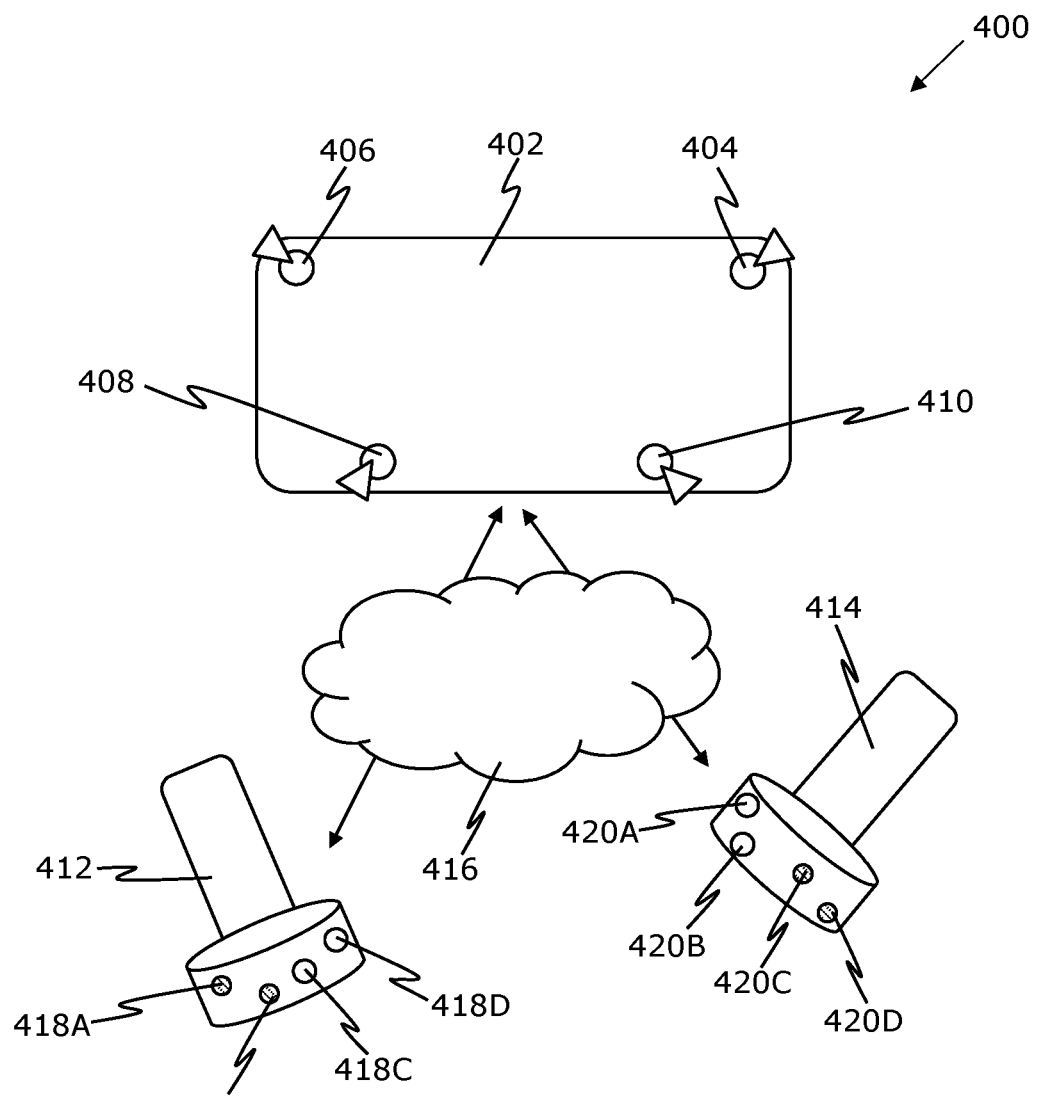
FIG. 4 is a schematic illustration of a tracking system in use, in accordance with an embodiment of the present disclosure.

Referring to FIG. 4, illustrated is a schematic illustration of a tracking system 400 in use, in accordance with an embodiment of the present disclosure. Herein, the HMD 402 comprises a plurality of cameras (depicted as cameras 404, 406, 408 and 410), where each respective camera of the plurality of cameras is arranged, for example, at a respective corner of the HMD 402. Moreover, the HMD 402 is communicably coupled to the first user-interaction controller 412 and the second user-interaction controller 414 via a radio communication interface 416, for example. Herein, the first user-interaction controller 412 comprises a first plurality of light sources (depicted as light sources 418A, 4188, 418C, and 418D, which are collectively referenced as 418A-D), wherein the light sources 418A and 4188 are deactivated, and the light sources 418C and 418D are activated. Herein, the second user-interaction controller 414 comprises a second plurality of light sources (depicted as light sources 420A, 4208, 420C, and 420D), where the light sources 420A and 42013 are activated, and the light sources 420C and 420D are deactivated.

Figure 5:
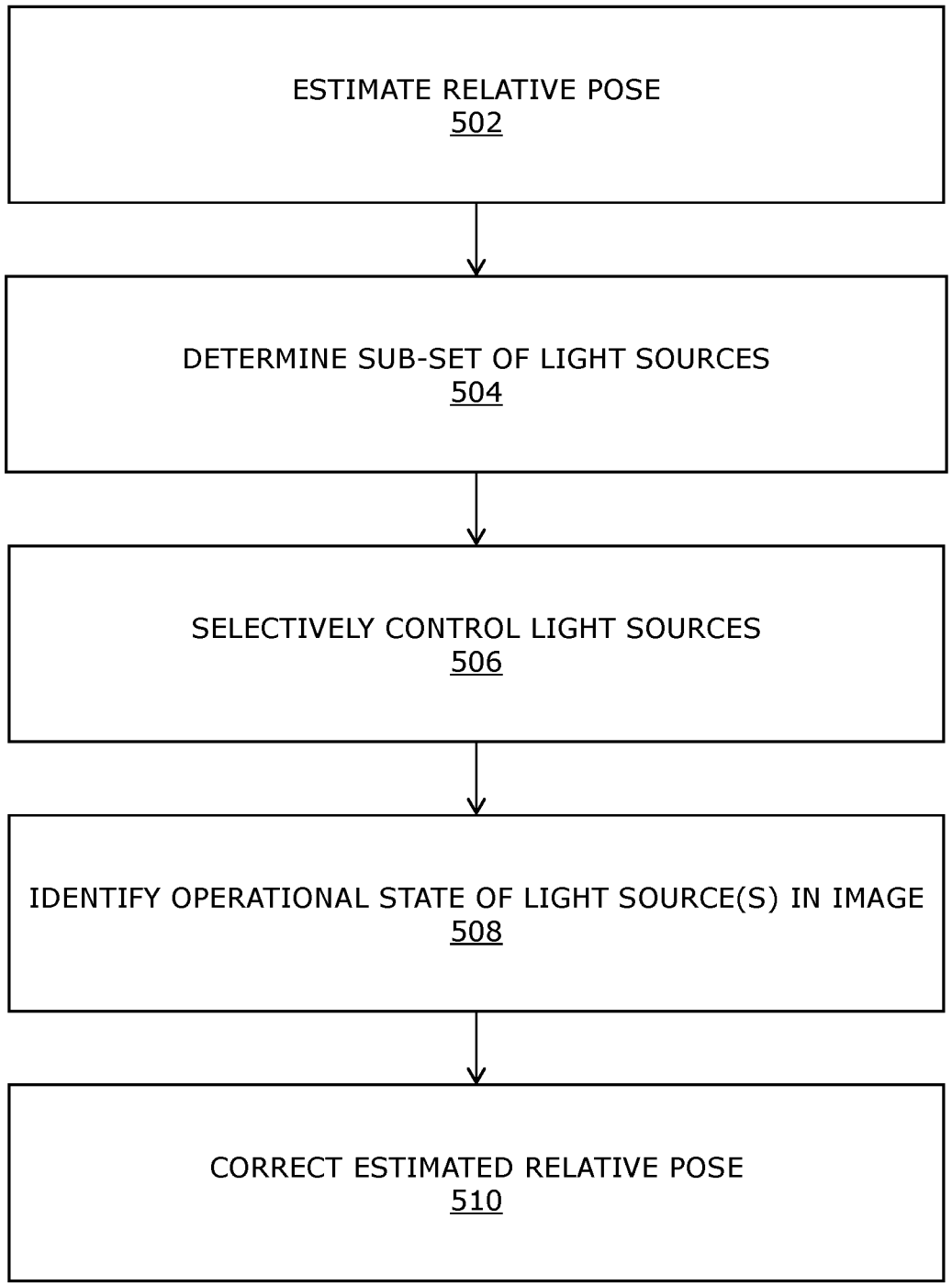
FIG. 5 illustrates steps of a method for tracking, in accordance with an embodiment of the present disclosure.

Referring to FIG. 5, illustrated is a flowchart for steps of a method for tracking, in accordance with an embodiment of the present disclosure. At step 502, a relative pose of at least one user-interaction controller with respect to a head-mounted device (HMD) is estimated, based on controller-pose-tracking data generated by a controller-pose-tracking means arranged in the at least one user-interaction controller and HMD-pose-tracking data generated by an HMD-pose-tracking means. At step 504, a sub-set of light sources that would be visible from a perspective of at least one camera, is determined from amongst a plurality of light sources, based on the estimated relative pose of the at least one user-interaction controller with respect to the HMD and an arrangement of the plurality of light sources arranged spatially around the at least one user-interaction controller of the HMD, the at least one camera being arranged on a portion of the HMD that faces a real-world environment in which the HMD is in use. At step 506, the plurality of light sources are selectively controlled such that only the light sources of the sub-set are activated, whereas remaining light sources from amongst the plurality of light sources are deactivated. At step 508, at least one image of the real-world environment, captured by the at least one camera, is processed for identifying an operational state of at least one light source of the sub-set that is visible in the at least one image, wherein the at least one image is indicative of an actual relative pose of the at least one user-interaction controller with respect to the HMD. At step 510, the estimated relative pose of the at least one user-interaction controller with respect to the HMD is corrected to determine the actual relative pose of the at least one user-interaction controller with respect to the HMD, based on the operational state of the at least one light source.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A tracking system for use in a head-mounted device (HMD), the tracking system comprising:
   a plurality of light sources arranged spatially around at least one user-interaction controller of the HMD;
   a controller-pose-tracking means arranged in the at least one user-interaction controller;
   an HMD-pose-tracking means;
   at least one camera arranged on a portion of the HMD that faces a real-world environment in which the HMD is in use; and
   at least one processor configured to:
      estimate a relative pose of the at least one user-interaction controller with respect to the HMD, based on controller-pose-tracking data generated by the controller-pose-tracking means and HMD-pose-tracking data generated by the HMD-pose-tracking means;

determine a sub-set of light sources from amongst the plurality of light sources that would be visible from a perspective of the at least one camera, based on the estimated relative pose of the at least one user-interaction controller with respect to the HMD and the arrangement of the plurality of light sources arranged spatially around the at least one user-interaction controller of the HMD;

selectively control the plurality of light sources such that the light sources of the sub-set are activated, whereas remaining light sources from amongst the plurality of light sources are deactivated;

process at least one image of the real-world environment, captured by the at least one camera, to identify an operational state of at least one light source that is visible in the at least one image, wherein the at least one image is indicative of an actual relative pose of the at least one user-interaction controller with respect to the HMD; and correct the estimated relative pose of the at least one user-interaction controller with respect to the HMD to determine the actual relative pose of the at least one user-interaction controller with respect to the HMD, based on the operational state of the at least one light source.

2. The tracking system of claim 1, wherein, when it is identified that the operational state of the at least one light source that is visible in the at least one image is that the at least one light source is deactivated, the at least one processor is further configured to:

control the plurality of light sources such that each of the plurality of light sources is activated;

process at least one next image of the real-world environment, captured by the at least one camera, to identify an operational state of one or more light sources that are visible in the at least one next image, wherein the at least one next image is indicative of the actual relative pose of the at least one user-interaction controller with respect to the HMD; and correct the estimated relative pose of the at least one user-interaction controller with respect to the HMD to determine the actual relative pose of the at least one user-interaction controller with respect to the HMD, based on the operational state of the one or more light sources.

3. The tracking system of claim 1, wherein the at least one processor is further configured to generate a visualization representing at least one of: the at least one user-interaction controller in its local coordinate system, the at least one user-interaction controller in a global coordinate system, required operational states of the plurality of light sources for selectively controlling the plurality of light sources.

4. The tracking system of claim 1, wherein when estimating the relative pose of the at least one user-interaction controller with respect to the HMD, the at least one processor is configured to:

process the controller-pose-tracking data to determine a pose of the at least one user-interaction controller in its local coordinate system;

process the HMD-pose-tracking data to determine a pose of the HMD in a global coordinate system;

convert the pose of the at least one user-interaction controller from said local coordinate system to the global coordinate system; and determine the relative pose of the at least one user-interaction controller with respect to the HMD, based on the pose of the at least one user-interaction controller in the global coordinate system and the pose of the HMD in the global coordinate system.

5. The tracking system of claim 4, wherein when processing the HMD-pose-tracking data to determine the pose of the HMD in the global coordinate system, the at least one processor is configured to:

process the HMD-pose-tracking data to determine a pose of the HMD in its local coordinate system; and convert the pose of the HMD from said local coordinate system to the global coordinate system.

6. The tracking system of claim 1, wherein when selectively controlling the plurality of light sources, the at least one processor is configured to:

generate and send a first drive signal to the light sources of the sub-set, wherein upon receiving the first drive signal, the light sources of the sub-set set are activated; and generate and send a second drive signal to the remaining light sources from amongst the plurality of light sources, wherein upon receiving the second drive signal, the remaining light sources are de-activated.

7. The tracking system of claim 1, wherein the plurality of light sources and the at least one camera are operatively synchronized in a manner that the at least one image is captured when the plurality of light sources are selectively controlled to activate only the light sources of the sub-set.

8. The tracking system of claim 1, wherein the at least one user-interaction controller comprises a first user-interaction controller and a second user-interaction controller for a first body part and a second body part of a user, respectively, wherein a first sub-set of light sources of the first user-interaction controller and a second sub-set of light sources of the second user-interaction controller are determined to be visible from the perspective of the at least one camera, and wherein the selective controlling of the plurality of light sources is performed using different control signals for the first user-interaction controller and the second user-interaction controller.

9. A method for tracking, the method comprising:

estimating a relative pose of at least one user-interaction controller with respect to a head-mounted device (HMD), based on controller-pose-tracking data generated by a controller-pose-tracking means arranged in the at least one user-interaction controller and HMD-pose-tracking data generated by an HMD-pose-tracking means;

determining a sub-set of light sources from amongst a plurality of light sources that would be visible from a perspective of at least one camera, based on the estimated relative pose of the at least one user-interaction controller with respect to the HMD and an arrangement of the plurality of light sources arranged spatially around the at least one user-interaction controller of the HMD, the at least one camera being arranged on a portion of the that faces a real-world environment in which the HMD is in use;

selectively controlling the plurality of light sources such that only the light sources of the sub-set are activated, whereas remaining light sources from amongst the plurality of light sources are deactivated;

processing at least one image of the real-world environment, captured by the at least one camera, for identifying an operational state of at least one light source of the sub-set that is visible in the at least one image, wherein the at least one image is indicative of an actual relative pose of the at least one user-interaction controller with respect to the HMD; and correcting the estimated relative pose of the at least one user-interaction controller with respect to the HMD to determine the actual relative pose of the at least one user-interaction controller with respect to the HMD, based on the operational state of the at least one light source.

10. The method of claim 9, wherein, when it is identified that the operational state of the at least one light source that is visible in the at least one image is that the at least one light source is deactivated, the method further comprises:

controlling the plurality of light sources such that each of the plurality of light sources is activated;

processing at least one next image of the real-world environment, captured by the at least one camera, to identify an operational state of one or more light sources that are visible in the at least one next image, wherein the at least one next image is indicative of the actual relative pose of the at least one user-interaction controller with respect to the HMD; and correcting the estimated relative pose of the at least one user-interaction controller with respect to the HMD for determining the actual relative pose of the at least one user-interaction controller with respect to the HMD, based on the operational state of the one or more light sources.

11. The method of claim 9, wherein the method further comprises generating a visualization representing at least one of: the at least one user-interaction controller in its local coordinate system, the at least one user-interaction controller in a global coordinate system, required operational states of the plurality of light sources for selectively controlling the plurality of light sources.

12. The method of claim 9, wherein estimating the relative pose of the at least one user-interaction controller with respect to the HMD comprises:

processing the controller-pose-tracking data to determine a pose of the at least one user-interaction controller in its local coordinate system;

processing the HMD-pose-tracking data to determine a pose of the HMD in a global coordinate system;

converting the pose of the at least one user-interaction controller from said local coordinate system to the global coordinate system; and determining the relative pose of the at least one user-interaction controller with respect to the HMD, based on the pose of the at least one user-interaction controller in the global coordinate system and the pose of the HMD in the global coordinate system.

13. The method of claim 9, wherein processing the HMD-pose-tracking data to determine the pose of the HMD in the global coordinate system comprises:

processing the HMD-pose-tracking data to determine a pose of the HMD in its local coordinate system; and converting the pose of the HMD from said local coordinate system to the global coordinate system.

14. The method of claim 9, wherein selectively controlling the plurality of light sources comprises:

generating and sending a first drive signal to the light sources of the sub-set, wherein upon receiving the first drive signal, the light sources of the sub-set are activated; and generating and sending a second drive signal to the remaining light sources from amongst the plurality of light sources, wherein upon receiving the second drive signal, the remaining light sources are deactivated.

15. The method of claim 9, wherein the plurality of light sources and the at least one camera are operatively synchronized in a manner that the at least one image is captured when the plurality of light sources are selectively controlled to activate only the light sources of the sub-set.

16. The method of claim 9, wherein the at least one user-interaction controller comprises a first user-interaction controller and a second user-interaction controller for a first body part and a second body part of a user, respectively, wherein a first sub-set of light sources of the first user-interaction controller and a second sub-set of light sources of the second user-interaction controller are determined to be visible from the perspective of the at least one camera, and wherein the selective controlling of the plurality of light sources is performed using different control signals for the first user-interaction controller and the second user-interaction controller.

* * * * *